United States Patent
Sasaki et al.

(10) Patent No.: US 9,304,183 B2
(45) Date of Patent: Apr. 5, 2016

(54) DEVICE FOR TRACKING ADJUSTMENT AND TRACKING ADJUSTMENT METHOD

(71) Applicant: FUJIFILM Corporation, Tokyo (JP)

(72) Inventors: Tadashi Sasaki, Saitama (JP); Junji Yamashita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/577,594

(22) Filed: Dec. 19, 2014

(65) Prior Publication Data

US 2015/0103185 A1    Apr. 16, 2015

Related U.S. Application Data

(63) Continuation of application No. PCT/JP2013/067191, filed on Jun. 24, 2013.

(30) Foreign Application Priority Data

Jun. 25, 2012  (JP) ................................. 2012-142329

(51) Int. Cl.
*H04N 5/232* (2006.01)
*G01S 3/786* (2006.01)
(Continued)

(52) U.S. Cl.
CPC ................. *G01S 3/7864* (2013.01); *G02B 7/28* (2013.01); *G02B 7/36* (2013.01); *G02B 15/161* (2013.01); *G03B 13/30* (2013.01); *G03B 13/36* (2013.01); *H04N 5/23203* (2013.01);
(Continued)

(58) Field of Classification Search
CPC ............ G02B 7/28; G02B 7/36; G03B 13/36; G03B 2205/0046; H04N 5/23293
USPC ......................................................... 348/169
See application file for complete search history.

(56) References Cited

U.S. PATENT DOCUMENTS

2003/0160886 A1    8/2003   Misawa et al.
2004/0036792 A1    2/2004   Moriya et al.

FOREIGN PATENT DOCUMENTS

JP      2004-207774      7/2004
JP      2004-258087      9/2004
(Continued)

OTHER PUBLICATIONS

International Search Report PCT/JP2013/067191 dated Sep. 24, 2013.
Written Opinion of the International Searching Authority PCT/JP2013/067191 dated Sep. 24, 2013.
Extended European search report, dated Dec. 22, 2015; Application No. 13809113.7.

*Primary Examiner* — Tat Chio
*Assistant Examiner* — Nguyen Truong
(74) *Attorney, Agent, or Firm* — Young & Thompson

(57) ABSTRACT

A device for tracking adjustment comprising a zoom instruction input device, a focus instruction input device, a tracking instruction input device, an image signal obtaining device, a determining device which determines whether a state is a first adjustment state in which the zoom lens is set by the zoom instruction input device at a position on a tele side and the focus lens is moved by the focus instruction input device or a second adjustment state in which the zoom lens is set by the zoom instruction input device at a position on a wide side and the tracking lens is moved by the tracking instruction input device, an area setting device, an evaluation value generating device, and a display device, wherein the determining device determines whether the state is the first adjustment state or the second adjustment state based on the image signal obtained from the camera device.

11 Claims, 16 Drawing Sheets

(51) Int. Cl.
   *G02B 7/28*    (2006.01)
   *G02B 7/36*    (2006.01)
   *G03B 13/36*   (2006.01)
   *G02B 15/16*   (2006.01)
   *G03B 13/30*   (2006.01)
   *H04N 17/00*   (2006.01)

(52) U.S. Cl.
   CPC ...... *H04N 5/23212* (2013.01); *H04N 5/23293* (2013.01); *H04N 5/23296* (2013.01); *H04N 17/002* (2013.01); *G03B 2205/0046* (2013.01)

(56) References Cited

FOREIGN PATENT DOCUMENTS

| | | |
|---|---|---|
| JP | 2004-280048 | 10/2004 |
| JP | 2005-043410 | 2/2005 |
| JP | 2005-140943 | 6/2005 |
| JP | 2007-295240 | 11/2007 |
| JP | 2013-140288 | 7/2013 |

OTHER PUBLICATIONS

Japanese Office Action dated Jan. 18, 2016 in corresponding Japanese Patent Application No. 2012-142329 with English translation of Japanese Office Action.

TELE

WIDE

FIG.13A

|  | TELE IMAGE | WIDE IMAGE |
|---|---|---|
| HISTOGRAM | MANY WHITE AND BLACK COMPONENTS | GRAY COMPONENT IS PRESENT |
| COLOR SIGNAL | SMALL NUMBER OF COLOR DIFFERENCE COMPONENTS | COLOR DIFFERENCE COMPONENT IS PRESENT |
| DISTRIBUTION OF HIGH-FREQUENCY COMPONENTS | HIGH DEGREE OF SYMMETRY ON SCREEN | LOW DEGREE OF SYMMETRY ON SCREEN |

FIG.13B

| INTERMEDIATE | HIGH | INTERMEDIATE |
|---|---|---|
| LOW | INTERMEDIATE | LOW |
| INTERMEDIATE | HIGH | INTERMEDIATE |

DEGREE OF SYMMETRY OF
HIGH-FREQUENCY COMPONENTS IN TELE IMAGE

FIG.15

RATIO D/V ON SCREEN WHEN DIAMETER D OF SIEMENS CHART IS 400 mm

| | | VERTICAL ANGLE OF VIEW [°] | SUBJECT DISTANCE [m] | D/V |
|---|---|---|---|---|
| ZOOM LENS OF HIGH-MAGNIFICATION LONG-FOCUS TYPE | LENS A | 34 | 3 | 22% |
| | | 34 | 4 | 17% |
| | | 34 | 5 | 13% |
| | | 34 | 6 | 11% |
| | LENS B | 34 | 6 | 11% |
| | LENS C | 24 | 3 | 31% |
| WIDE-TYPE ZOOM LENS | LENS D | 45 | 3 | 16% |
| | | 45 | 4 | 12% |
| | LENS E | 41 | 2 | 27% |
| | | 41 | 3 | 18% |
| | | 41 | 5 | 11% |
| | LENS F | 62 | 2 | 17% |
| | | 62 | 3 | 11% |

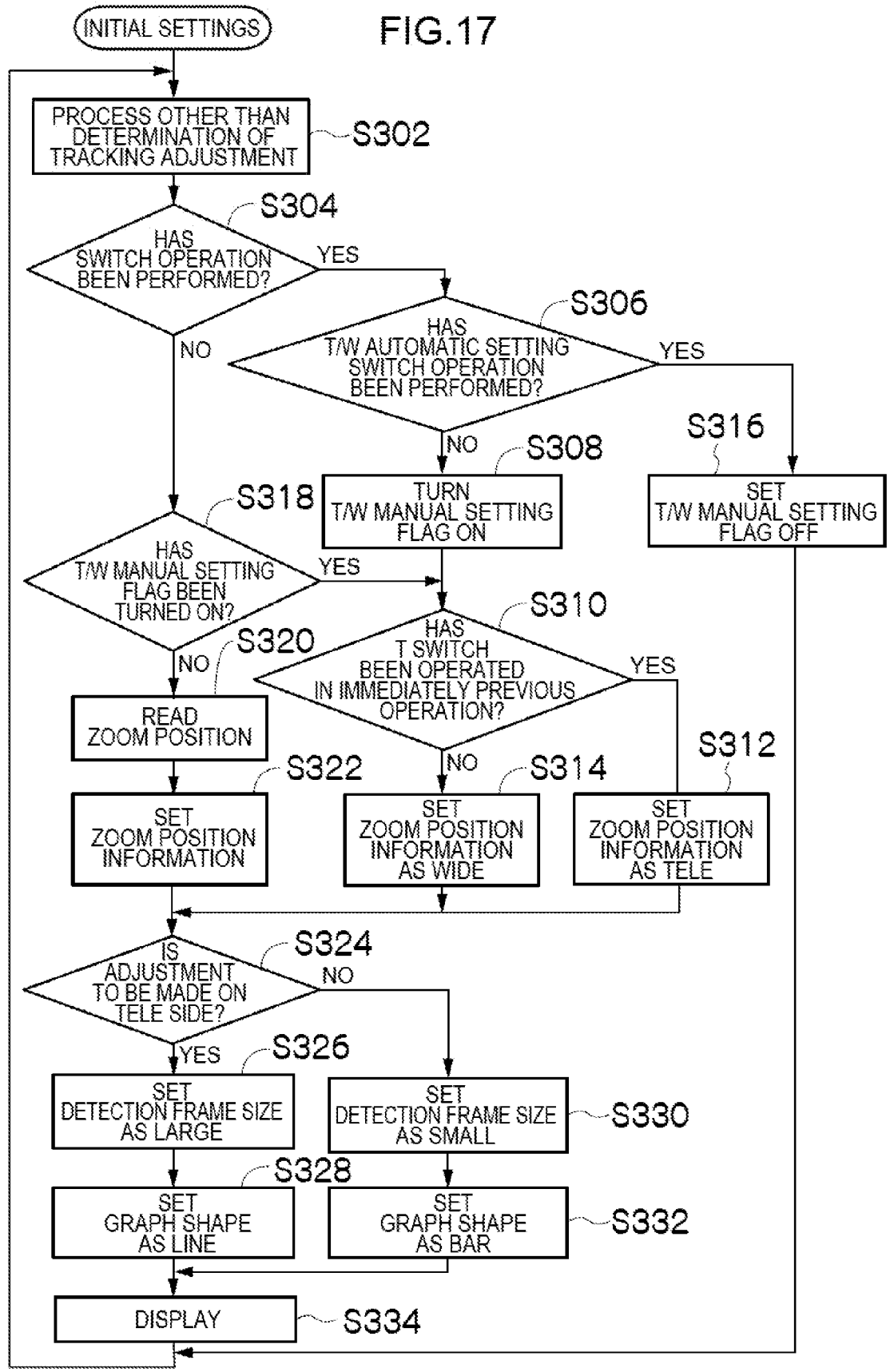

DEVICE FOR TRACKING ADJUSTMENT AND TRACKING ADJUSTMENT METHOD

CROSS-REFERENCE TO RELATED APPLICATIONS

This application is a Continuation of PCT International Application No. PCT/JP2013/067191 filed on Jun. 24, 2013, which claims priority under 35 U.S.C §119(a) to Japanese Patent Application No. 2012-142329 filed on Jun. 25, 2012. Each of the above application(s) is hereby expressly incorporated by reference, in its entirety, into the present application.

BACKGROUND OF THE INVENTION

1. Field of the Invention

The present invention relates to a device for tracking adjustment, tracking adjustment method, and program capable of increasing accuracy in tracking adjustment (back focus adjustment) and capable of achieving reduction in adjustment time.

2. Description of the Related Art

Conventionally, in a television camera lens device, so-called tracking adjustment (also referred to as "back focus adjustment") is performed in which focus adjustment is performed by using a movable lens group (tracking lens) allowing the position of the image plane to be adjusted so as to prevent focus blurring (zoom focus movement) by zooming. In a work procedure, the zoom position is first set at a tele end to move a focus lens, thereby focusing on an adjustment chart (a still object for tracking adjustment). Next, the zoom position is set at a wide end, and a tracking lens disposed on a rear side of the focus lens in an optical axis direction is moved, thereby focusing on the adjustment chart. The above-described work is repeatedly performed, and if the adjustment chart is not out of focus even when the zoom position is changed, tracking adjustment is completed.

Japanese Patent Application Laid-Open No. 2004-280048 discloses a structure in which the iris is set to be in an open state at the time of focusing by auto focusing.

Japanese Patent Application Laid-Open No. 2007-295240 discloses that a graph representing a relation between a focus position and an evaluation value of a focus state is displayed based on an image signal.

Japanese Patent Application Laid-Open No. 2005-140943 discloses a structure in which switching can be made by a display selection switch between a graph representing a relation between the focus position and the evaluation value of the focus state and a bar graph of the evaluation value of the focus state.

SUMMARY OF THE INVENTION

In a first focus adjustment to be performed by moving the focus lens, an evaluation value of a focus state is calculated from an image at a tele end as depicted in FIG. 12A. On the other hand, in a second focus adjustment to be performed by moving the tracking lens, an evaluation value of a focus state is calculated from an image at a wide end as depicted in FIG. 12B. Here, if a subject around the perimeter of the adjustment chart is within a detection area for detecting an evaluation value at the time of the second focus adjustment, an accurate evaluation value cannot be obtained. With this, even if the first focus adjustment and the second focus adjustment are repeatedly performed, tracking adjustment may not be completed. Moreover, even if tracking adjustment is completed, problems arise such as degraded adjustment accuracy and time wasting.

The present invention was made in view of these circumstances, and has an object of providing a device for tracking adjustment, tracking adjustment method, and program capable of increasing accuracy in tracking adjustment (back focus adjustment) and achieving a reduction in adjusting time.

To achieve the object described above, a device for tracking adjustment according to one aspect of the present invention is a device for tracking adjustment including a zoom instruction input device to which an instruction for moving a zoom lens movable to change a focal length is inputted, a focus instruction input device to which an instruction for moving a focus lens movable to focus on a subject is inputted, and a tracking instruction input device to which an instruction for moving a tracking lens movable to change a position of an image plane is inputted, the device for tracking adjustment including an image signal obtaining device which obtains an image signal from a camera device having a lens device mounted thereon, the camera device having the zoom lens, the focus lens, and the tracking lens, a determining device which determines whether a state is a first adjustment state in which the zoom lens is set by the zoom instruction input device at a position on a tele side and the focus lens is moved by the focus instruction input device or a second adjustment state in which the zoom lens is set by the zoom instruction input device at a position on a wide side and the tracking lens is moved by the tracking instruction input device, an area setting device which sets a detection area for detecting a focus state of the lens device with respect to the image signal obtained by the image signal obtaining device, the area setting device switching a size of the detection area between the first adjustment state and the second adjustment state based on the determination result of the determining device, an evaluation value generating device which generates an evaluation value indicating the focus state of the lens device from the image signal obtained by the image signal obtaining device, the evaluation value generating device generating the evaluation value within the detection area set by the area setting device in an entire screen region of the image signal, and a display device which displays the evaluation value generated by the evaluation value generating device.

According to one aspect of the present invention, the area setting device extracts an image of a specific still subject from the image signal, and switches the size of the detection area according to a size of the extracted image.

According to one aspect of the present invention, the determining device determines whether the state is the first adjustment state or the second adjustment state based on the image signal obtained from the camera device.

According to one aspect of the present invention, the determining device determines whether the state is the first adjustment state or the second adjustment state based on a zoom position signal indicating a position of the zoom lens outputted from one of the zoom instruction input device and the lens device.

According to one aspect of the present invention, the determining device determines whether the state is the first adjustment state or the second adjustment state based on an input operation by a user.

According to one aspect of the present invention, the evaluation value generating device generates a graph in a format different between the first adjustment state and the second adjustment state, and the display device displays the graph generated by the evaluation value generating device.

Also, a tracking adjustment method according to one aspect of the present invention is a tracking adjustment method by using a zoom instruction input device to which an instruction for moving a zoom lens movable to change a focal length is inputted, a focus instruction input device to which an instruction for moving a focus lens movable to focus on a subject is inputted, and a tracking instruction input device to which an instruction for moving a tracking lens movable to change a position of an image plane is inputted, and the method includes a determining step of determining whether a state is a first adjustment state in which the zoom lens is set by the zoom instruction input device at a position on a tele side and the focus lens is moved by the focus instruction input device or a second adjustment state in which the zoom lens is set by the zoom instruction input device at a position on a wide side and the tracking lens is moved by the tracking instruction input device, an area setting step of setting a detection area for detecting a focus state of the lens device with respect to the image signal obtained from a camera device having a lens device mounted thereon, the camera device having the zoom lens, the focus lens, and the tracking lens, the area setting step of switching a size of the detection area between the first adjustment state and the second adjustment state based on the determination result in the determining step, an evaluation value generating step of generating an evaluation value indicating the focus state of the lens device from the obtained image signal, the evaluation value generating step of generating the evaluation value within the detection area set in the area setting step in an entire screen region of the image signal, and a display step of displaying the evaluation value generated in the evaluation value generating step.

Furthermore, the present invention provides a program which causes a computer device to perform the above-described tracking adjustment method. This program can be provided as being recorded on a predetermined recording medium.

According to the present invention, accuracy in back focus adjustment (tracking adjustment) can be increased, and a reduction in adjusting time can be achieved.

BRIEF DESCRIPTION OF THE DRAWINGS

FIG. 13A is a descriptive diagram depicting a difference between the tele image and the wide image.

FIG. 13B is a descriptive diagram depicting degrees of symmetry in the tele image on the screen.

FIG. 15 is a descriptive diagram depicting an example of a ratio D/V between an image size D and a screen size V of the adjustment chart.

FIG. 17 is a flowchart depicting a flow of a tracking adjustment process of Example 3.

DETAILED DESCRIPTION OF THE PREFERRED EMBODIMENTS

Embodiments of the present invention are described in detail below according to the attached drawings.

Figure 1:
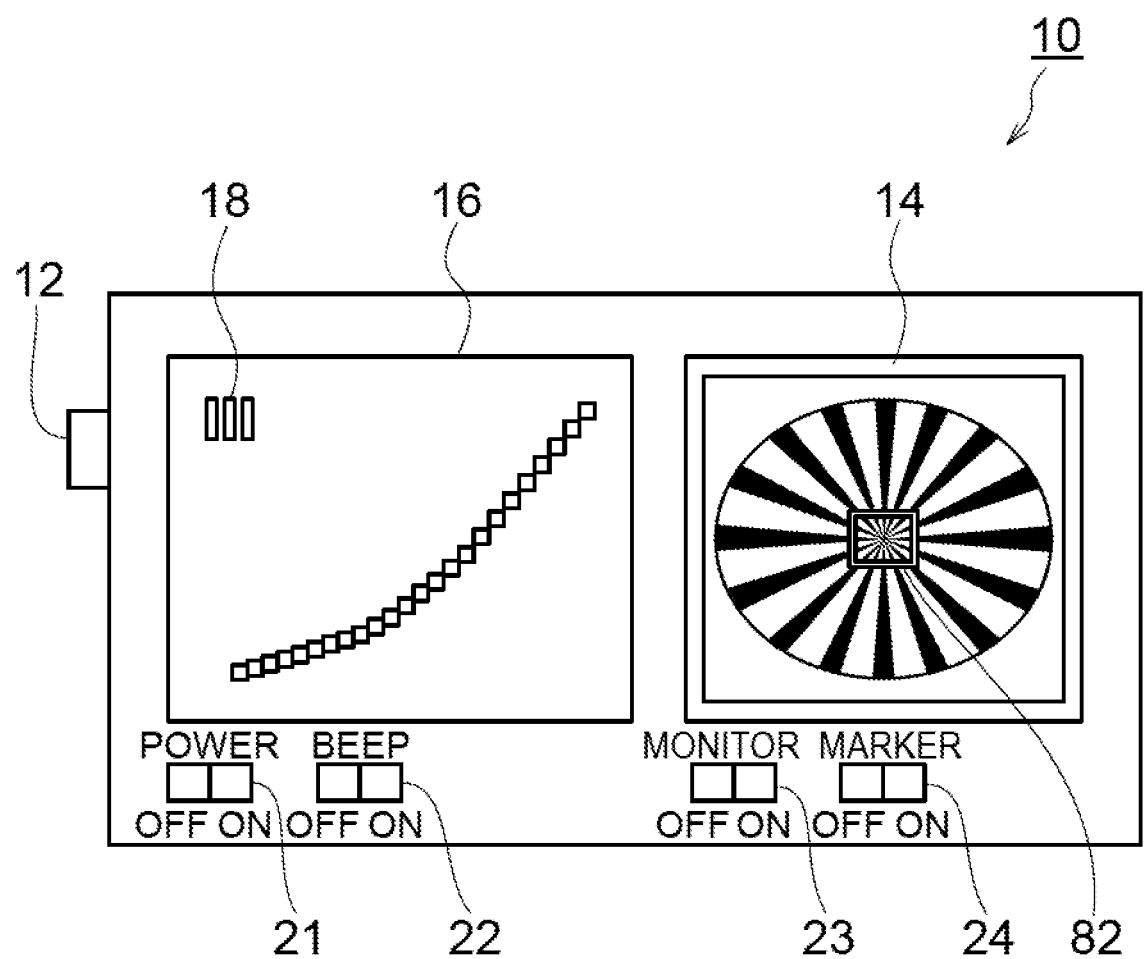
FIG. 1 is a front view depicting an external view of an example of a device for tracking adjustment according to the present invention.

FIG. 1 depicts an external view of an example of a device for tracking adjustment according to the present invention.

A device for tracking adjustment 10 depicted in FIG. 1 includes an image signal input terminal 12, a monitor 14 which mainly displays a taken image, an indicator 16 which mainly displays a graph, and a loudspeaker 18 which outputs a beep sound. The indicator 16 may be integrally provided together with the monitor 14, and it is assumed in description made below that the indicator 16 is integrally provided together with the monitor 14.

A "POWER" switch 21 is an operation switch for switching a power supply of the device for tracking adjustment 10 between ON and OFF. A "BEEP" switch 22 is an operation switch for switching a beep sound output from the loudspeaker 18 between ON and OFF. A "MONITOR" switch 23 is an operation switch for switching display of the monitor 14 between ON and OFF. A "MARKER" switch 24 is a switch for switching as to whether marking (recording) is to be performed. Note that marking will be described further below.

Figure 2:
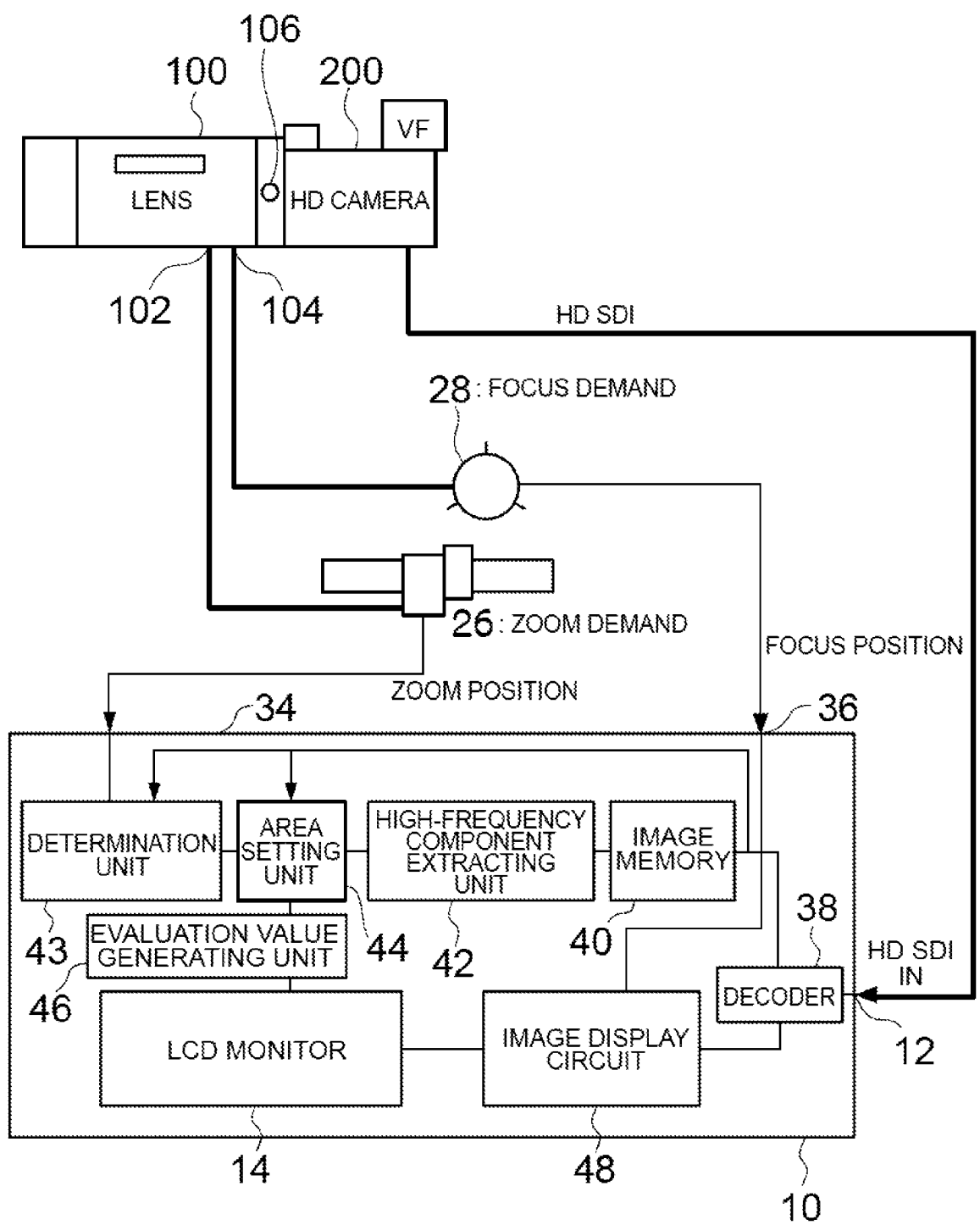
FIG. 2 is an entire structural diagram depicting an example of a tracking adjustment system including a device for tracking adjustment of FIG. 1.

FIG. 2 is an entire structural diagram depicting an example of a tracking adjustment system including the device for tracking adjustment 10 of FIG. 1.

The lens device 100 is configured to include optical members such as a zoom lens, a focus lens, and a tracking lens. The zoom lens is a lens movable in its optical axis direction to change a focal length. The focus lens is a lens movable in its optical axis direction to focus on a subject. The tracking lens is a lens movable in its optical axis direction to change the position of an image plane. Although the sequence of arrangement of the zoom lens and the focus lens is not particularly restrictive, the tracking lens is arranged on a rear side (a camera device 200 side) of the focus lens in the optical axis direction.

The camera device 200 is configured to include an image pickup device which takes an image of a subject formed in the lens device 100. The camera device 200 of the this example outputs an HD-SDI (High Definition Serial Digital Interface) image signal.

A zoom demand 26 is an input device for manually inputting an instruction of a zoom position (position of the zoom lens). A focus demand 28 is an input device for manually inputting a focus position (position of the focus lens). The lens device 100 is provided with a zoom instruction signal input terminal 102 to which a zoom instruction signal outputted from the zoom demand 26 is inputted and a focus instruction signal input terminal 104 to which a focus instruction signal outputted from the focus demand 28 is inputted. The zoom instruction signal indicates a zoom position of a move destination, and the focus instruction signal indicates a focus position of the move destination. Also, the lens device 100 is provided with a tracking adjustment knob 106 for moving the position of the tracking lens. That is, by the user turning the tracking adjustment knob 106, an instruction for moving the tracking lens is manually inputted. Note that an operation device equivalent to the zoom demand 26 and the focus demand 28 may be provided to the lens device 100. In the present invention, an operation device may be provided to the lens device 100, a signal input terminal is provided to the lens device 100, or both of an operation device and a signal input terminal may be provided to the lens device 100.

To the image signal input terminal 12 of the device for tracking adjustment 10, an HD-SDI image signal is inputted from the camera device 200. To a zoom position signal input terminal 34 of the device for tracking adjustment 10, a zoom position signal is inputted from the zoom demand 26. To a focus position signal input terminal 36 of the device for tracking adjustment 10, a focus position signal is inputted from the focus demand 28.

The device for tracking adjustment 10 includes a decoder 38 which decodes an image signal inputted to the image signal input terminal 12, an image memory 40 which temporarily stores the image signal decoded in the decoder 38 as an image for each frame, a high-frequency component extracting unit 42 which extracts frequency components in a high range (high-frequency components) from the image signal (image), a determining unit 43 which determines whether the state is a first focus adjustment state of moving the focus lens or a second focus adjustment state of moving the tracking lens, an area setting unit 44 which sets a detection area for detecting a focus state of the lens device 100 with respect to the image signal (image) based on the determination result of the determining unit 43, an evaluation value generating unit 46 which detects a focus state within the detection area set by the area setting unit 44 in an entire screen region of the image signal (image) and generates an evaluation value (focus evaluation value) indicating the focus state, and an image display circuit 48 which converts the image signal decoded in the decoder 38 to a format displayable on the monitor 14. The determining unit 43, the area setting unit 44, and the evaluation value generating unit 46 are configured of for example, a CPU (Central Processing Unit). The high-frequency component extracting unit 42 is configured of, for example, a circuit (or CPU).

The determining unit 43 of this example determines that the state is the first focus adjustment state of moving the focus lens by the focus demand 28 when the zoom lens is set by the zoom demand 26 at a tele side position (hereinafter simply referred to as "tele"). On the other hand, when the zoom lens is set by the zoom demand 26 at a wide side position (hereinafter simply referred to as "wide"), the determining unit 43 determines that the state is the second focus adjustment state of moving the tracking lens by the tracking adjustment knob 106. Note that various determination modes of the determining unit 43 are present, and other determination modes will be described further below. The area setting unit 44 switches the size of a detection area (an area in which a focus evaluation value is detected) for detecting a focus state of the lens device 100 based on the determination result of the determining unit 43. Specifically, the area setting unit 44 decreases the size of the detection area of the focus evaluation value more in the second focus adjustment state in which the zoom position is at "wide" than in the first focus adjustment state in which the zoom position is at "tele" side. Note that although "tele" and "wide" are not particularly restrictive when they are at both ends of a movable range of the zoom position, adjustment is preferably performed at both ends of the movable range of the zoom position.

The monitor 14 in FIG. 2 also serves as the indicator 16 in FIG. 1, capable of simultaneously displaying an image indicating the image signal obtained from the camera device 200 and a graph representing a focus state of the lens device 100. Also, the device for tracking adjustment 10 has a function of marking with a focus evaluation value. When the "MARKER" switch 24 in FIG. 1 is turned ON, the evaluation value generating unit 46 performs marking of recording a relation between changes of the focus position and changes of the focus evaluation values on a work memory omitted in the drawing, and causes a graph representing the marking result to be displayed on the monitor 14. Furthermore, the evaluation value generating unit 46 causes a peak value of the focus evaluation value and a focus position at which the focus evaluation value becomes the peak value to be displayed on the monitor 14. In the case where the "BEEP" switch 22 in FIG. 1 is in an ON state, a beep sound is outputted from the loudspeaker 18 when the focus evaluation value becomes at its peak. Also, as depicted in FIG. 1, a defection frame 82 for detecting a focus evaluation value is displayed on the monitor 14 together with the image. The monitor 14 of this example is configured of a small-sized liquid-crystal display (LCD). This allows accurate tracking adjustment even at a site without a large-sized monitor.

Figure 3:
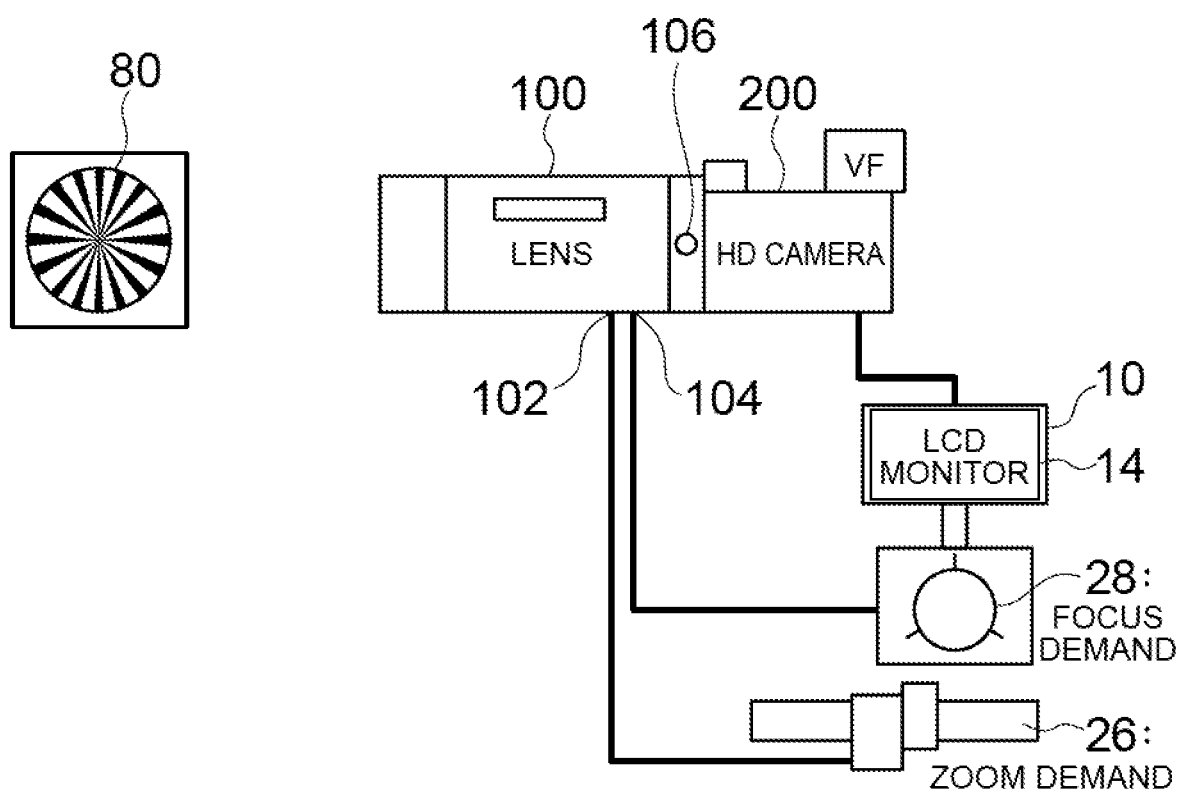
FIG. 3 is a descriptive diagram depicting the state in which an image of an adjustment chart is taken by a camera device having a lens device mounted thereon.
Figure 4A:
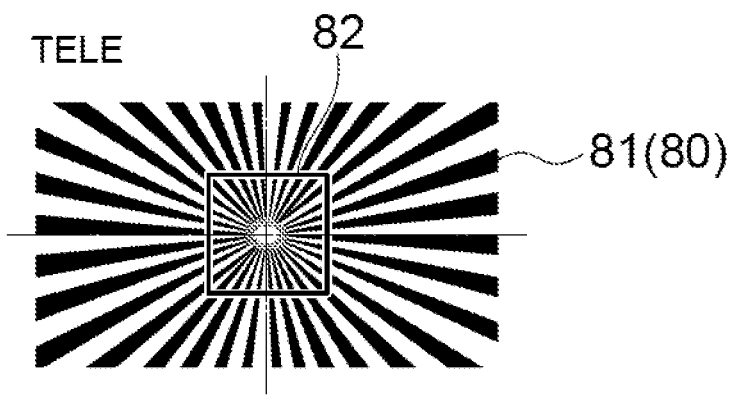
FIG. 4A is a descriptive diagram depicting a screen when an image of an adjustment chart is taken at a tele end.
Figure 4B:
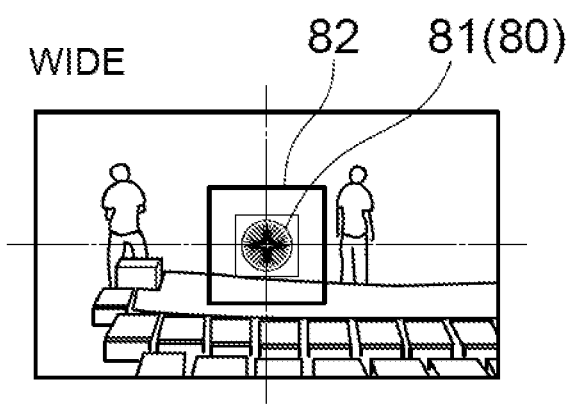
FIG. 4B is a descriptive diagram depicting a screen with a detection frame size matching a tele end, when an image of an adjustment chart is taken at a wide end.
Figure 4C:
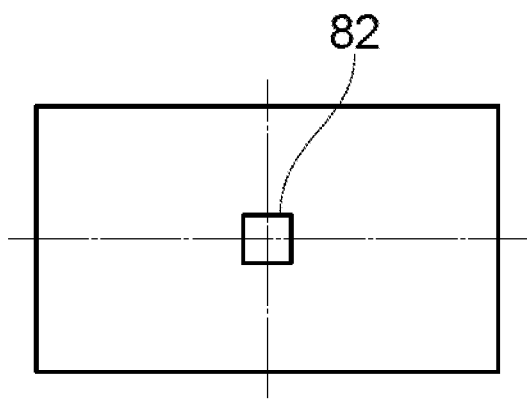
FIG. 4C is a descriptive diagram depicting a screen with a small detection frame size.

Next, the reason why the detection area for the focus evaluation value is decreased at the time of the second focus adjustment by the tracking adjustment knob 106 is described. As depicted in FIG. 3, when an image of an adjustment chart 80 is taken as a subject by the camera device 200 via the lens device 100, the zoom position is "tele" at the time of the first focus adjustment by the focus demand 28, and the detection frame 82 is within an image 81 of the adjustment chart 80 as depicted in FIG. 4A. Therefore, an accurate focus evaluation value is generated for the adjustment chart 80. On the other hand, at the time of the second focus adjustment by the tracking adjustment knob 106, the zoom position is "wide", and the detection frame 82 is not within the image 81 of the adjustment chart 80 as depicted in FIG. 4B. Therefore, the image of a subject (for example, a person) different in distance from the adjustment chart 80 is within the detection frame 82. To get around this, as depicted in FIG. 4C, at the time of the second focus adjustment, the size of the detection frame 82 is decreased to prevent the image of a subject other than the image 81 of the adjustment chart 80 from being within the detection frame 82.

Figure 5:
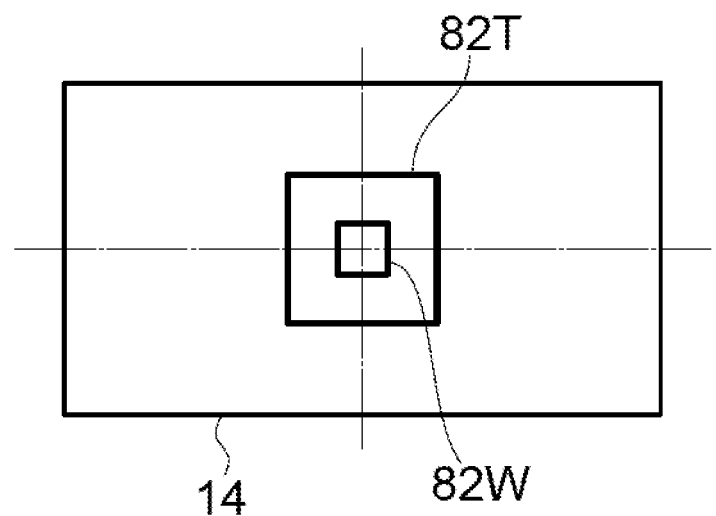
FIG. 5 is a descriptive diagram for use in describing switching of the detection frame size.

FIG. 5 depicts examples of the detection frame displayed on the monitor 14. In FIG. 5, a reference character 82T denotes a detection frame when the zoom position is between an intermediate position to a tele end, and a reference character 82W denotes a detection frame when the zoom position is at a wide end. As such, the area setting unit 44 of the device for tracking adjustment 10 switches the size of the detection frame 82 (the size of the detection area) according to the zoom position.

Figure 6:
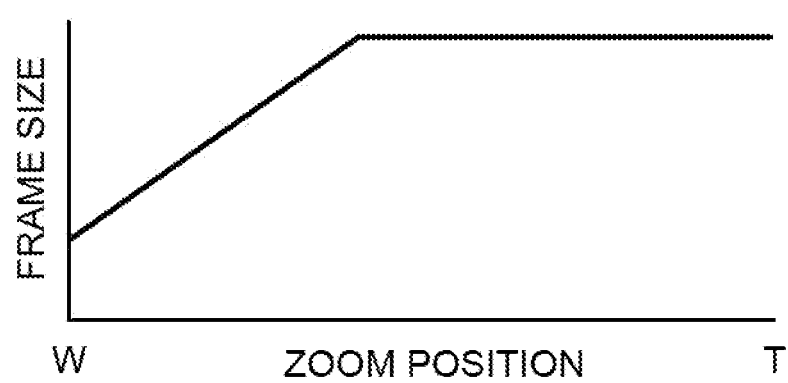
FIG. 6 is a descriptive diagram for use in describing an example of switching the detection frame size according to the zoom position.

FIG. 6 depicts an example of a relation between the zoom position and the size of the detection frame 82, with the horizontal axis representing the zoom position and the vertical axis representing the size of the detection frame 82. Note that the relation between the zoom position and the size of the detection area is not particularly restricted to the case depicted in FIG. 6. For example, the size of the detection area may be set as a first fixed size when the zoom position is on a tele side exceeding a threshold, and the size of the detection area may be set as a second fixed size smaller than the first size when the zoom position is on a wide side equal to or smaller than the threshold.

Various examples of tracking adjustment are described below.

Figure 7:
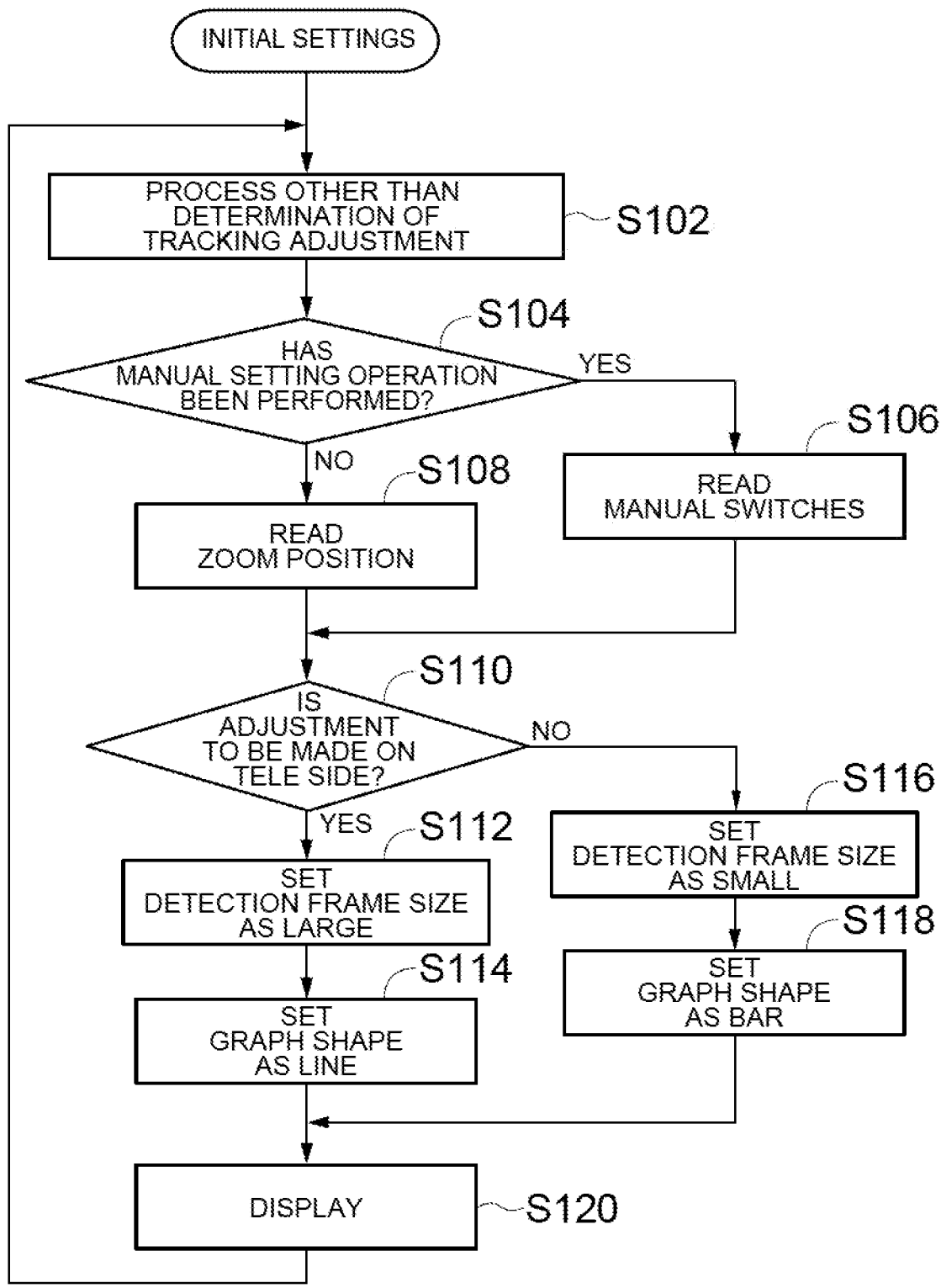
FIG. 7 is a flowchart depicting a flow of a tracking adjustment process of Example 1.

FIG. 7 is a flowchart depicting a flow of a tracking adjustment process of Example 1. This process is performed according to a program by a CPU configuring the determining unit 43, the area setting unit 44, and the evaluation value generating unit 46 of the device for tracking adjustment 10. In this example, as depicted in FIG. 2, a zoom position signal is inputted to the zoom position signal input terminal 34. The determining unit 43 of this example determines an adjustment state based on the inputted zoom position signal.

In FIG. 7, a process other than determination of tracking adjustment is first performed (step S102).

Subsequently, it is determined whether a manual setting operation has been performed (step S104).

Figure 8:
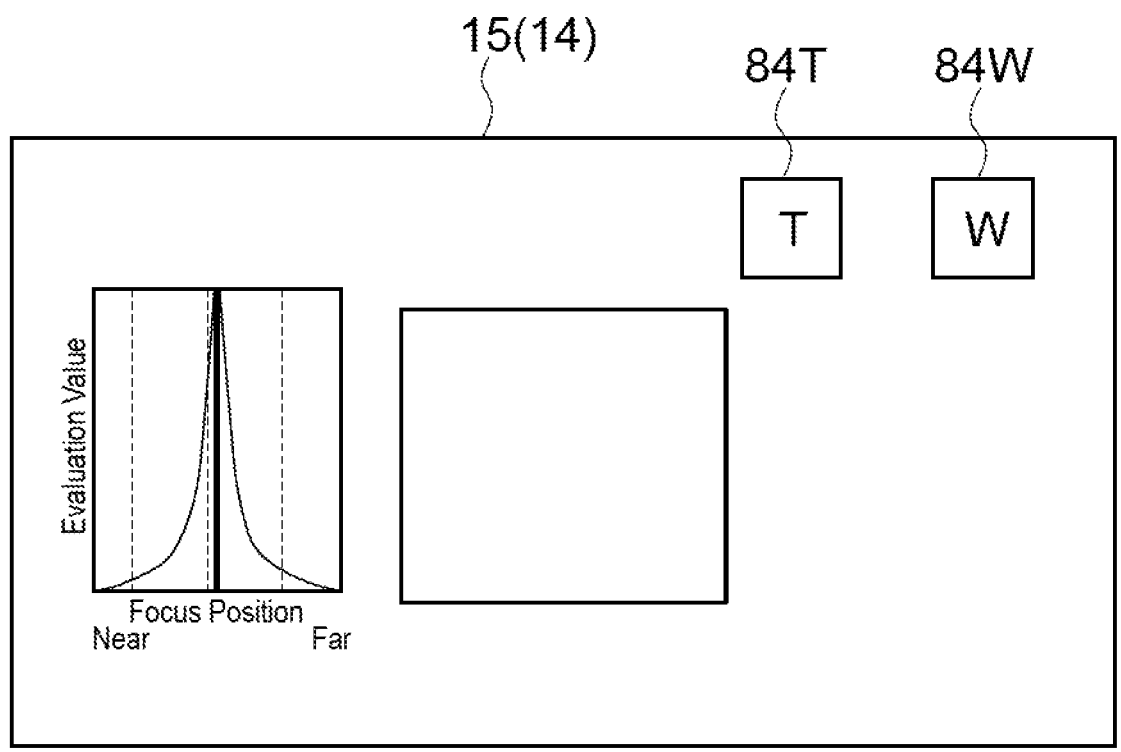
FIG. 8 is a descriptive diagram depicting an example of display of the device for tracking adjustment including a touch panel.

As depicted in FIG. 8, in this example, the monitor 14 is configured of a touch panel 15. As manual switches for inputting a zoom position, a "T" switch 84T and a "W" switch 84W are displayed on the touch panel 15. When the "T" switch 84T is touched, "tele" is inputted as a zoom position. When the "W" switch 84W is touched, "wide" is inputted as a zoom position.

If a manual setting operation has been performed, the manual switches are read (step S106). If a manual setting operation has not been performed, the zoom position signal inputted to the zoom position signal input terminal 34 is read (step S108).

Subsequently, by the determining unit 43 determining whether the zoom position is "tele", it is determined whether the state is a state of performing focus adjustment by the focus demand 28 or a state of performing focus adjustment by the tracking adjustment knob 106 (step S110). That is, the determining unit 43 determines whether the state is the first focus adjustment state or the second focus adjustment state, based on the zoom position signal or the manual switches.

Figure 9:
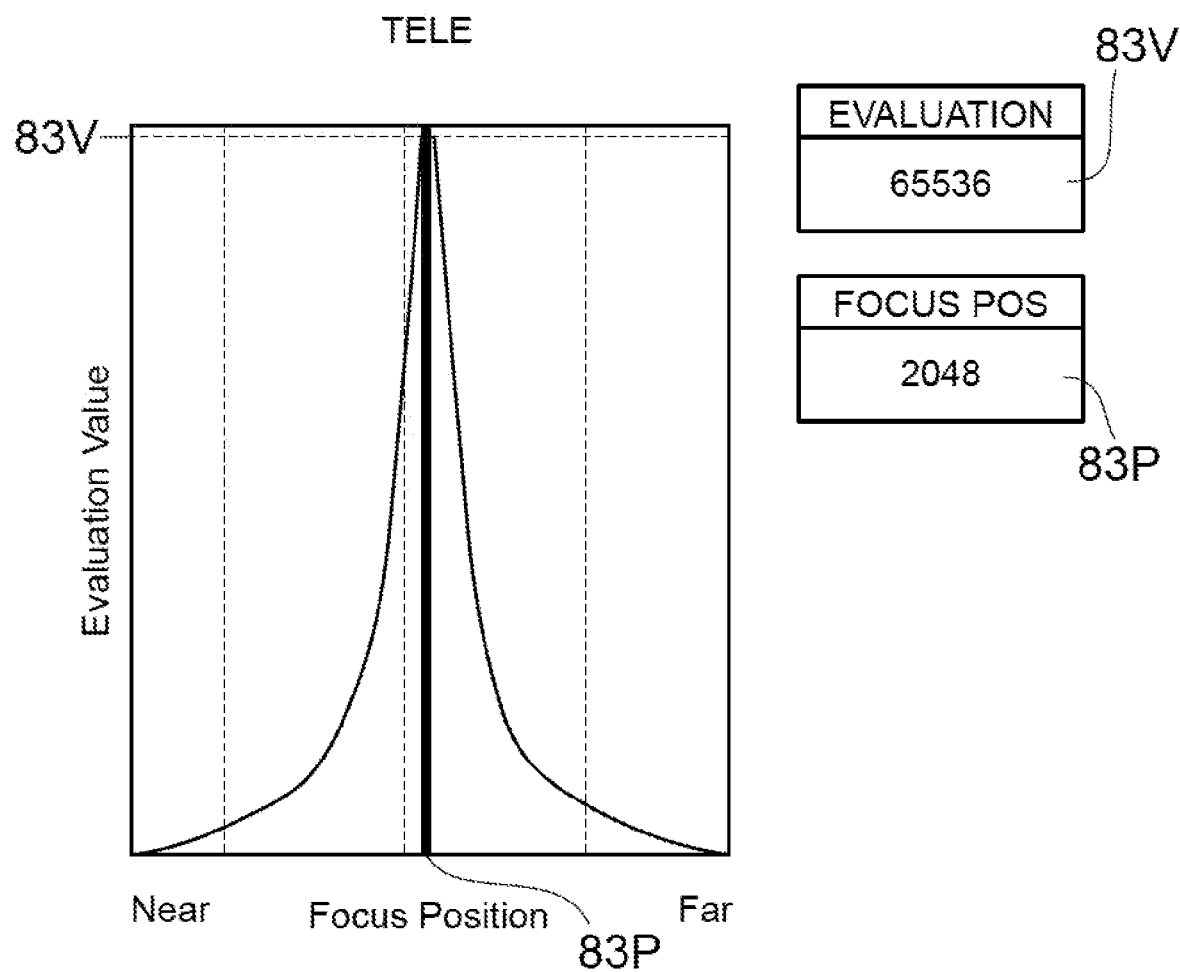
FIG. 9 is a diagram depicting an example of a graph representing changes of a focus evaluation value with respect to changes of the focus position.

When the zoom position is "tele", the area setting unit 44 sets the detection frame for detecting a focus evaluation value as a large size (step S112) and, as depicted in FIG. 9, the evaluation value generating unit 46 generates a graph by setting a graph shape as a line (step S114). The graph in FIG. 9 is generated by the evaluation value generating unit 46 based on the focus position signal inputted to the focus position signal input terminal 36. This graph represents changes of the focus evaluation value within the detection frame 82 with respect to the changes of the focus position and also represents a maximum value 83V of the focus evaluation value and a focus position 83P when the focus evaluation value becomes the maximum value 83V.

Figure 10:
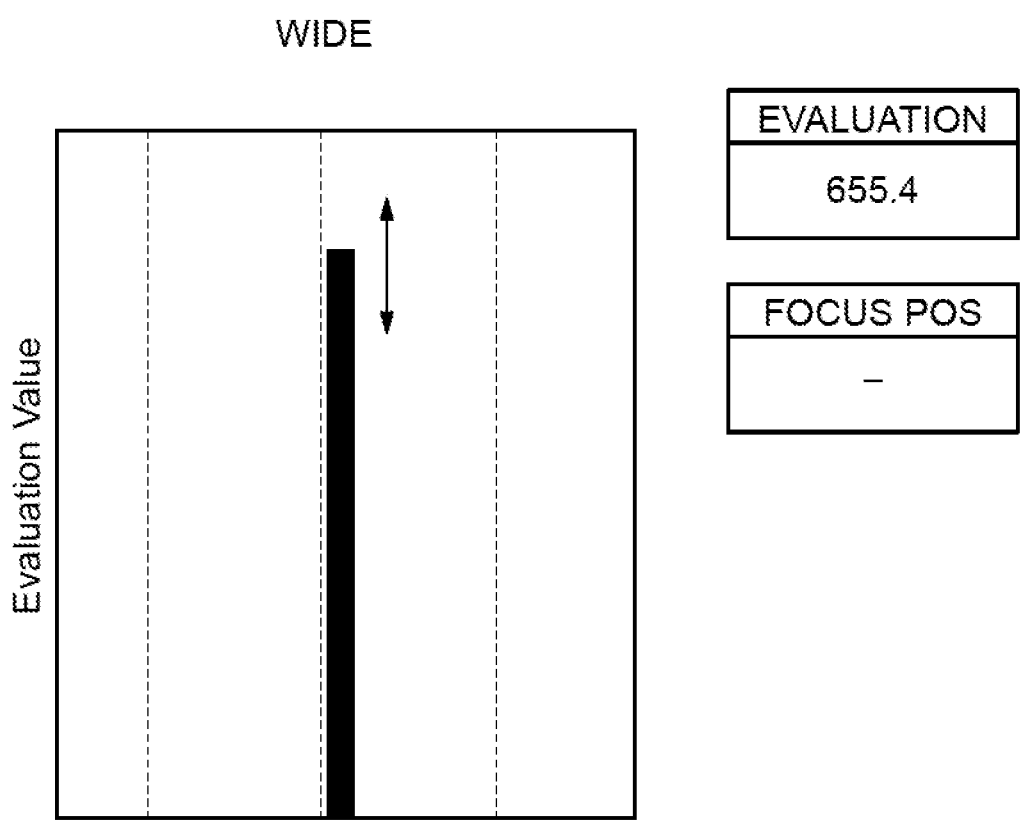
FIG. 10 is a diagram depicting an example of a graph in a bar shape representing a focus evaluation value corresponding to the current position of a tracking lens.

When the zoom position is "wide", the area setting unit 44 sets the detection frame for detecting a focus evaluation value as a small size (step S116) and, as depicted in FIG. 10, the evaluation value generating unit 46 generates a graph by setting a graph shape as a bar (step S118). This graph is a graph in a bar shape in which the focus evaluation value vertically changes according to the changes of the position of the tracking lens (tracking position). That is, this graph represents, on a real-time basis, a focus evaluation value corresponding to the current position of the tracking lens. Note that while the bar depicted in FIG. 10 has a vertically-oriented shape, the bar may have a horizontally-oriented shape.

The generated graph is displayed on the monitor 14 (step S120).

As described above, the size of the detection area for detecting a focus evaluation value (the size of the detection frame 82) is switched between the first focus adjustment performed in "tele" and the second focus adjustment performed in "wide". Therefore, both at the time of the first focus adjustment of moving the focus lens and at the time of the second focus adjustment of moving the tracking lens, a focus evaluation value is generated with similar accuracy. Also, when marking is performed with the focus position is changed in "tele", the graph in a line shape depicted in FIG. 9 is automatically displayed. When the tracking position is adjusted in "wide", the graph is automatically switched to the graph in a bar shape depicted in FIG. 10. Therefore, tracking adjustment can be easily completed in a short period of time.

Note that while the case is depicted in FIG. 2 in which signals are inputted from the zoom demand 26 and the focus demand 28 to the device for tracking adjustment 10, the present invention is not restricted to this case. For example, a zoom position signal and a focus position signal may be inputted from the lens device 100 to the device for tracking adjustment 10.

Figure 11:
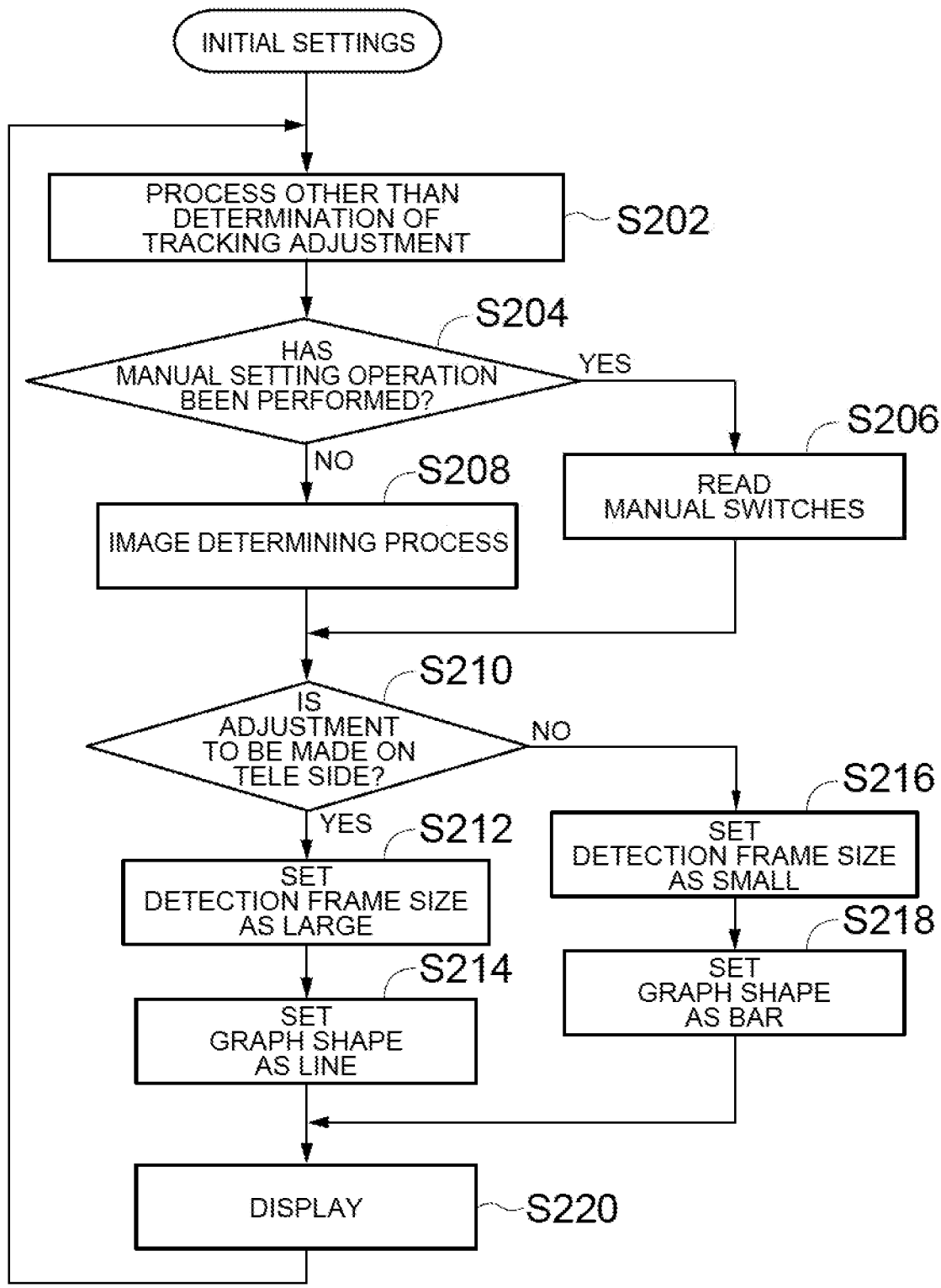
FIG. 11 is a flowchart depicting a flow of a tracking adjustment process of Example 2.

FIG. 11 is a flowchart depicting a flow of a tracking adjustment process of Example 2. This process is performed according to a program by the CPU of the device for tracking adjustment 10.

Steps S202 to S206 are similar to steps S102 to S106 of Example 1 depicted in FIG. 7, and are not described herein.

In Example 2 depicted in FIG. 11, if a manual setting operation has not been performed (NO at step S204), it is determined based on the image signal obtained from the camera device 200 whether adjustment on a tele side is performed by image processing (step S208).

Figure 12A:
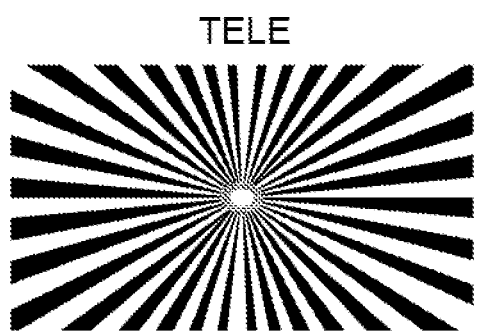
FIG. 12A is a diagram depicting an example of a tele image.
Figure 12B:
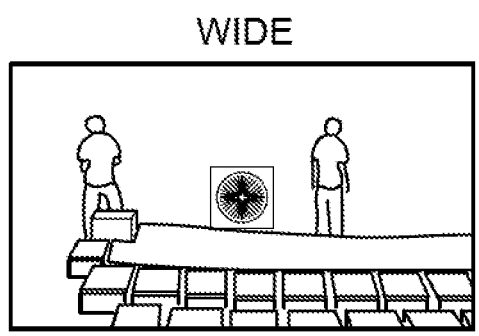
FIG. 12B is a diagram depicting an example of a wide image.

FIG. 12A depicts an example of an image obtained by taking an image of the adjustment chart 80 of FIG. 3 by the camera device 200 when the zoom position is "tele" (the obtained image is hereinafter referred to as a "tele image"). FIG. 12B depicts an example of an image obtained by taking an image of the adjustment chart 80 of FIG. 3 by the camera device 200 when the zoom position is "wide" (the obtained image is hereinafter referred to as a "wide image").

The tele image in FIG. 12A and the wide image in FIG. 12B have significant differences in a histogram of color distribution, color signal (luminance+color difference signal), and distribution of high-frequency components on the screen, as depicted in FIG. 13A. The adjustment chart 80 of FIG. 3 has a black-and-white radial stripe shape. Therefore, regarding the histogram of color distribution, the frequency of both of white and black components is significantly higher in the tele image than the frequency of components of other colors, and the frequency of gray components is higher in the wide image than that in the tele image. Also, regarding the color signal, the color difference components are decreased in the tele image, and color difference components are increased in the wide image. Furthermore, regarding the distribution of high-frequency components on the screen, as depicted in FIG. 13B, the degree of symmetry of high-frequency components is high in the tele image, and the degree of symmetry is low in the wide image.

Based on the image signal obtained from the camera device 200, the determining unit 43 of the device for tracking adjustment 10 in this example determines whether the zoom position is "tele". For example, whether the zoom position is "tele" or "wide" based on at least one of the histogram of color distribution, a color difference of color signals, and distribution of high-frequency components on the screen.

For example, when the frequency of both white and black exceeds a threshold in the histogram of color distribution, the determining unit 43 of the lens device 100 determines that the zoom position is "tele".

Also, for example, the determining unit 43 of the lens device 100 determines whether high-frequency components have radial symmetry on the screen, and determines that the zoom position is "tele" when the high-frequency components have radial symmetry.

With this, even if settings are not performed with a manual operation or if the environment does not allow obtainment of a zoom position signal, it is possible to accurately determine whether the state is the first focus adjustment state or the second focus adjustment state.

Steps S210 to S220 are similar to steps S110 to S120 of Example 1 depicted in FIG. 7, and are not described herein.

Figure 14A:
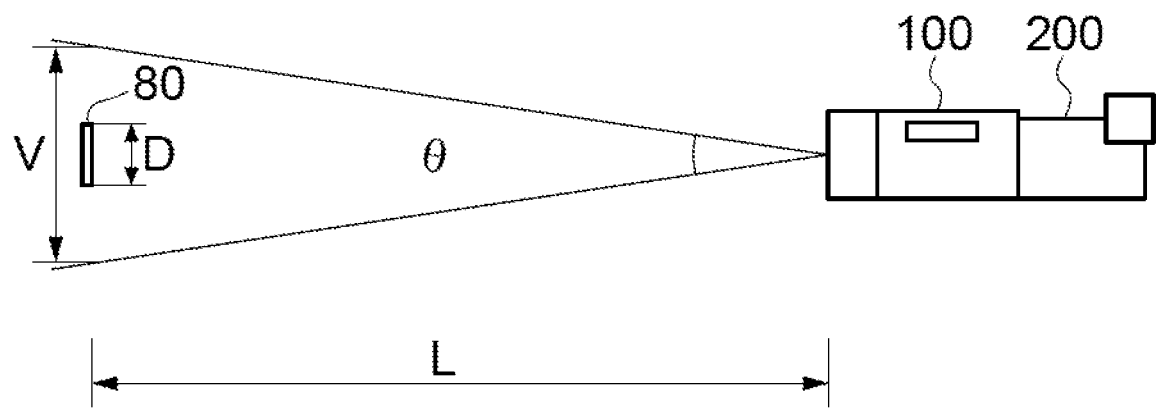
FIG. 14A is a descriptive diagram depicting the state in which an image of the adjustment chart is being taken.
Figure 14B:
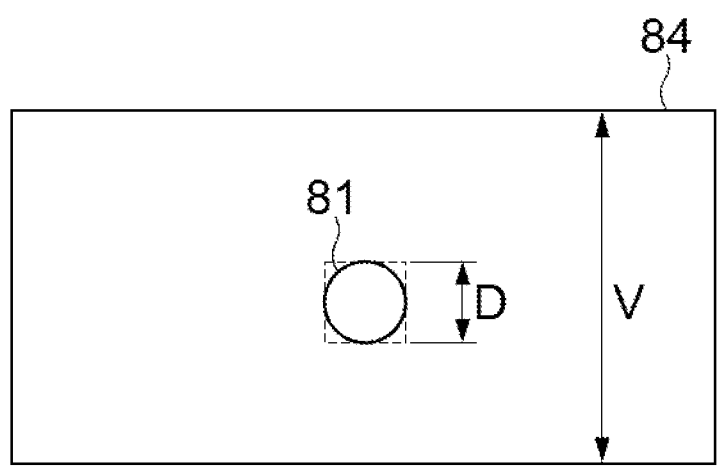
FIG. 14B is a descriptive diagram depicting an image of the adjustment chart in an entire screen region of an image signal.

The state in which an image of the adjustment chart 80 is being taken is depicted in FIG. 14A, and the image 81 of the adjustment chart 80 within an entire screen region 84 (screen) of the image signal is depicted in FIG. 14B.

In FIG. 14A, a length L to the adjustment chart 80 is any depending on the lens specifications and actual image-taking distance, and is, for example, 2 meters to 6 meters. However, in a long-focus-type zoom lens, the MOD (minimum object distance) is often on the order of 3 meters and the length L is set to be longer than that distance.

The size of the detection frame for detecting a focus evaluation value is determined by the area setting unit 44 as a value proportional to a ratio between the size of the entire screen region 84 and the size of the image 81 of the adjustment chart 80 (in this example, D/V). The area setting unit 44 extracts the image 81 of the adjustment chart 80 from the image signal, and switches the size of the detection frame 82 (size of the detection area) according to a size D of the extracted image.

An example of the ratio D/V between the size D of the image 81 of the adjustment chart 80 and a screen size V is depicted in FIG. 15. When a Siemens chart as the adjustment chart 80 (D in FIG. 14A) was assumed to have a diameter of 400 mm, D/V at the wide end was 11% to 31% in the lens device 100 of this example, as depicted in FIG. 15. Therefore, a detection area for detecting a focus evaluation value at the wide end is selected from among, for example, a square having each side of 10% of the height of the screen, a square having each side of 20% thereof, and a square having each side of 30% thereof. The detection area may be adjustable in a range of 10% to 30%.

Figure 16A:
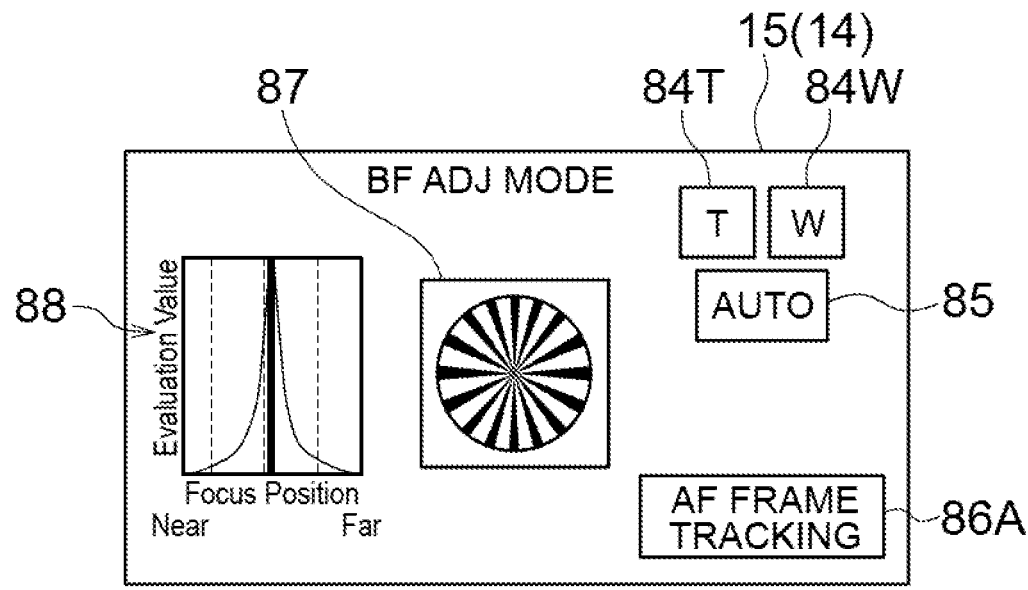
FIG. 16A is a descriptive diagram depicting an example of a screen in a back focus adjustment mode.
Figure 16B:
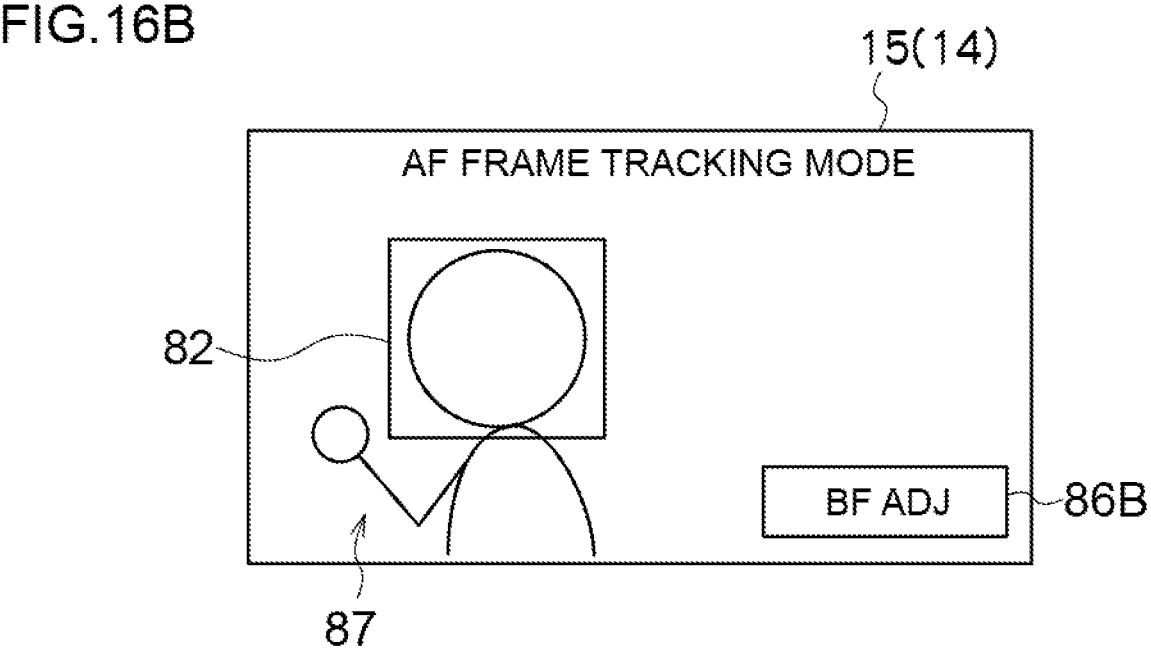
FIG. 16B is a descriptive diagram depicting an example of a screen in an AF frame tracking mode.

FIG. 16A and FIG. 16B depict examples of the screen in the device for tracking adjustment 10. In this example, the monitor 14 is configured of the touch panel 15. A display mode is switched by touching either one of display mode selection switches 86A and 86B on the touch panel 15.

In a back focus adjustment (BF ADJ) mode depicted in FIG. 16A, a taken image 87 representing the image signal obtained from the camera device 200, a graph 88, the "T" switch 84T, the "W" switch 84W, and a display mode selection switch 86A for switching to an AF (Automatic Focus) frame tracking mode are displayed. The "T" switch 84T and the "W" switch 84W are identical to those depicted in FIG. 10. Also in this example, a zoom position is obtained by accepting a touch operation.

In the AF frame tracking mode depicted in FIG. 16B, the detection frame 82 is displayed so as to be superposed on the taken image 87 representing the image signal obtained from the camera device 200. The CPU of the device for tracking adjustment 10 causing tracking of a main subject and also tracking of the detection frame 82.

FIG. 17 is a flowchart depicting a flow of an example of a tracking adjusting process of Example 3. This process is performed according to a program by the CPU of the device for tracking adjustment 10.

First, a process other than determination of tracking adjustment is performed (step S302).

Subsequently, it is determined whether a switch operation has been performed (step S304). In this example, it is determined whether any of the "T" switch 84T, the "W" switch 84W, and the "AUTO" switch 85 depicted in FIG. 16A has been operated.

If a switch operation has been performed, it is determined whether the "AUTO" switch 85 for inputting an instruction for tele/wide automatic setting has been operated (step S306).

If the AUTO switch 85 has not been operated (if the "T" switch 84T or the "W" switch 84W has been operated), a T/W manual setting flag is turned ON (step S308), and it is determined whether the immediately previous operation is an operation of the "T" switch 84T (step S310). Then, if the "T" switch 84T has been operated, the zoom position information is set as "tele" (step S312). If the immediately previous operation is an operation of the "W" switch 84W, the zoom position information is set as "wide" (step S314).

If the "AUTO" switch has been operated, the T/W manual setting flag is turned OFF (step S316).

If no switch operation has been performed, it is determined whether the T/W manual setting flag has been turned ON (step S318). Here, if the T/W manual setting flag has been turned ON, the process proceeds to step S310. If the T/W manual setting flag has been turned OFF (in the case of tele/wide automatic setting), a zoom position signal is read from the zoom position signal input terminal 34 (step S320), and zoom position information is set according to the zoom position signal (step S322). That is, if the "AUTO" switch 85 has been operated, tele/wide is automatically set according to the zoom position signal.

Steps S324 to S334 are similar to steps S110 to S120 in FIG. 7, and are not described herein.

Note that the device for tracking adjustment 10 may be configured of a computer device in place of dedicated hardware. In this case, the tracking adjustment method described in the specification is caused to be performed by a computer device according to a program. Also, the present invention can be provided as computer-readable program code for causing the device to perform the above-described process, a non-transitory and computer-readable recording medium (for example, an optical disk (for example, a CD (Compact Disc), DVD (Digital Versatile Disc) or BD (Blu-ray Disc)) having the program code stored therein, a magnetic disk (for example, a hard disk or an optical magnetic disk), or a computer program product having executable code for the method stored therein.

The present invention is not restricted to the examples described in the specification and the examples depicted in the drawings, and it goes without saying that various design changes and improvements can be made within a range not deviating from the gist of the present invention.

The specification discloses the following inventions.

(Invention 1) A device for tracking adjustment including a zoom instruction input device to which an instruction for moving a zoom lens movable to change a focal length is inputted, a focus instruction input device to which an instruction for moving a focus lens movable to focus on a subject is inputted, and a tracking instruction input device to which an instruction for moving a tracking lens movable to change a position of an image plane is inputted, the device including image signal obtaining device which obtains an image signal from a camera device having a lens device mounted thereon, the camera device having the zoom lens, the focus lens, and the tracking lens, a determining device which determines whether a state is a first adjustment state in which the zoom lens is set by the zoom instruction input device at a position on a tele side and the focus lens is moved by the focus instruction input device or a second adjustment state in which the zoom lens is set by the zoom instruction input device at a position on a wide side and the tracking lens is moved by the tracking instruction input device, an area setting device which sets a detection area for detecting a focus state of the lens device with respect to the image signal obtained by the image signal obtaining device, the area setting device switching a size of the detection area between the first adjustment state and the second adjustment state based on the determination result of the determining device, an evaluation value generating device which generates an evaluation value indicating the focus state of the lens device from the image signal obtained by the image signal obtaining device, the evaluation value generating device generating the evaluation value within the detection area set by the area setting device in an entire screen region of the image signal, and a display device which displays the evaluation value generated by the evaluation value generating device.

(Invention 2) The device for tracking adjustment according to invention 1, wherein the area setting device sets the size of the detection area in the second adjustment state smaller than the size of the detection area in the first adjustment state.

(Invention 3) The device for tracking adjustment according to invention 1 or 2, wherein the determining device determines whether the state is the first adjustment state or the second adjustment state based on the image signal obtained from the camera device.

(Invention 4) The device for tracking adjustment according to invention 1 or 2, wherein the determining device determines whether the state is the first adjustment state or the second adjustment state based on a zoom position signal indicating a position of the zoom lens outputted from one of the zoom instruction input device and the lens device.

(Invention 5) The device for tracking adjustment according to invention 1 or 2, wherein the determining device determines whether the state is the first adjustment state or the second adjustment state based on an input operation by a user.

(Invention 6) The device for tracking adjustment according to any one of inventions 1 to 5, wherein the area setting device extracts an image of a specific still subject from the image signal, and switches the size of the detection area according to a size of the extracted image.

(Invention 7) The device for tracking adjustment according to any one of inventions 1 to 6, wherein the evaluation value generating device generates a graph in a format different between the first adjustment state and the second adjustment state, and the display device displays the graph generated by the evaluation value generating device.

(Invention 8) The device for tracking adjustment according to invention 7, wherein the evaluation value generating device generates a first graph representing changes of the evaluation value of the focus state with respect to changes of a position of the focus lens when the state is the first adjustment state, and generates a second graph in a bar shape representing the evaluation value of the focus state corresponding to a current position of the tracking lens when the state is the second adjustment state.

(Invention 9) A tracking adjustment method using zoom instruction an input device to which an instruction for moving a zoom lens movable to change a focal length is inputted, a focus instruction input device to which an instruction for moving a focus lens movable to focus on a subject is inputted, and a tracking instruction input device to which an instruction for moving a tracking lens movable to change a position of an image plane is inputted, the method including a determining step of determining whether a state is a first adjustment state in which the zoom lens is set by the zoom instruction input device at a position on a tele side and the focus lens is moved by the focus instruction input device or a second adjustment state in which the zoom lens is set by the zoom instruction input device at a position on a wide side and the tracking lens is moved by the tracking instruction input device, an area setting step of setting a detection area for detecting a focus state of the lens device with respect to the image signal obtained from a camera device having a lens device mounted thereon, the camera device having the zoom lens, the focus lens, and the tracking lens, the area setting step of switching a size of the detection area between the first adjustment state and the second adjustment state based on the determination result in the determining step, an evaluation value generating step of generating an evaluation value indicating the focus state of the lens device from the obtained image signal, the evaluation value generating step of generating the evaluation value within the detection area set in the area setting step in an entire screen region of the image signal, and a display step of displaying the evaluation value generated in the evaluation value generating step.

(Invention 10) The tracking adjustment method according to invention 9, wherein in the area setting step, the size of the detection area in the second adjustment state is set smaller than the size of the detection area in the first adjustment state.

(Invention 11) The tracking adjustment method according to invention 9 or 10, wherein in the determining step, it is determined whether the state is the first adjustment state or the second adjustment state based on the image signal obtained from the camera device.

(Invention 12) The tracking adjustment method according to invention 9 or 10, wherein in the determining step, it is determined whether the state is the first adjustment state or the second adjustment state based on a zoom position signal indicating a position of the zoom lens outputted from one of the zoom instruction input device and the lens device.

(Invention 13) The tracking adjustment method according to invention 9 or 10, wherein in the determining step, it is determined whether the state is the first adjustment state or the second adjustment state based on an input operation by a user.

(Invention 14) The tracing adjustment method according to any one of inventions 9 to 13, wherein in the area setting step, an image of a specific still subject is extracted from the image signal, and the size of the detection area is switched according to a size of the extracted image.

(Invention 15) The tracking adjustment method according to any one of inventions 9 to 14, wherein in the evaluation value generating step, a graph is generated in a format different between the first adjustment state and the second adjustment state, and in the displaying step, the graph generated in the evaluation value generating step is displayed.

(Invention 16) The tracking adjustment method according to invention 15, wherein in the evaluation value generating step, a first graph is generated when the state is the first adjustment state, the first graph representing a position of the focus lens when the evaluation value indicating the focus state becomes maximum with respect to changes of the position of the focus lens, and a second graph in a bar shape is generated when the state is the second adjustment state, the second graph in which the evaluation value indicating the focus state changes according to changes of a position of the tracking lens.

(Invention 17) A program which causes a computer device to perform the tracking adjustment method according to any one of inventions 9 to 16. This program is provided as being recorded on a predetermined recording medium.

What is claimed is:

1. A device for tracking adjustment comprising:
    a zoom instruction input device to which an instruction for moving a zoom lens movable to change a focal length is inputted;
    a focus instruction input device to which an instruction for moving a focus lens movable to focus on a subject is inputted;
    a tracking instruction input device to which an instruction for moving a tracking lens movable to change a position of an image plane is inputted;
    an image signal obtaining device which obtains an image signal from a camera device having a lens device mounted thereon, the camera device having the zoom lens, the focus lens, and the tracking lens;
    a determining device which determines whether a state is a first adjustment state in which the zoom lens is set by the zoom instruction input device at a position on a tele side and the focus lens is moved by the focus instruction input device or a second adjustment state in which the zoom lens is set by the zoom instruction input device at a position on a wide side and the tracking lens is moved by the tracking instruction input device;
    an area setting device which sets a detection area for detecting a focus state of the lens device with respect to the image signal obtained by the image signal obtaining device, the area setting device switching a size of the detection area between the first adjustment state and the second adjustment state based on the determination result of the determining device;
    an evaluation value generating device which generates an evaluation value indicating the focus state of the lens device from the image signal obtained by the image signal obtaining device, the evaluation value generating device generating the evaluation value within the detection area set by the area setting device in an entire screen region of the image signal; and
    a display device which displays the evaluation value generated by the evaluation value generating device,
    wherein
    the determining device determines whether the state is the first adjustment state or the second adjustment state based on the image signal obtained from the camera device
    wherein the evaluation value generating device generates a graph in a format different between the first adjustment state and the second adjustment state, and
    the display device displays the graph generated by the evaluation value generating device;
    wherein the evaluation value generating device generates a first graph representing changes of the evaluation value of the focus state with respect to changes of a position of the focus lens when the state is the first adjustment state, and generates a second graph in a bar shape representing the evaluation value of the focus state corresponding to a current position of the tracking lens when the state is the second adjustment state.

2. The device for tracking adjustment according to claim 1, wherein
    the area setting device sets the size of the detection area in the second adjustment state smaller than the size of the detection area in the first adjustment state.

3. The device for tracking adjustment according to claim 1, wherein
    the area setting device extracts an image of a specific still subject from the image signal, and switches the size of the detection area according to a size of the extracted image.

4. The device for tracking adjustment according to claim 2, wherein
    the determining device determines whether the state is the first adjustment state or the second adjustment state based on a zoom position signal indicating a position of the zoom lens outputted from one of the zoom instruction input device and the lens device.

5. The device for tracking adjustment according to claim 2, wherein
    the determining device determines whether the state is the first adjustment state or the second adjustment state based on an input operation by a user.

6. A tracking adjustment method using a zoom instruction input device to which an instruction for moving a zoom lens movable to change a focal length is inputted, a focus instruction input device to which an instruction for moving a focus lens movable to focus on a subject is inputted, and a tracking instruction input device to which an instruction for moving a tracking lens movable to change a position of an image plane is inputted, the method comprising:
    a determining step of determining whether a state is a first adjustment state in which the zoom lens is set by the zoom instruction input device at a position on a tele side and the focus lens is moved by the focus instruction input device or a second adjustment state in which the zoom lens is set by the zoom instruction input device at a position on a wide side and the tracking lens is moved by the tracking instruction input device;
    an area setting step of setting a detection area for detecting a focus state of the lens device with respect to the image signal obtained from a camera device having a lens device mounted thereon, the camera device having the zoom lens, the focus lens, and the tracking lens, the area setting step of switching a size of the detection area between the first adjustment state and the second adjustment state based on the determination result in the determining step;
    an evaluation value generating step of generating an evaluation value indicating the focus state of the lens device from the obtained image signal, the evaluation value generating step of generating the evaluation value within the detection area set by the area setting step in an entire screen region of the image signal; and
    a display step of displaying the evaluation value generated in the evaluation value generating step, wherein in the determining step, it is determined whether the state is the first adjustment state or the second adjustment state based on the image signal obtained from the camera device wherein in the evaluation value generating step, a graph is generated in a format different between the first adjustment state and the second adjustment state, and in the displaying step, the graph generated in the evaluation value generating step is displayed;

wherein in the evaluation value generating step, a first graph is generated when the state is the first adjustment state, the first graph representing a position of the focus lens when the evaluation value indicating the focus state becomes maximum with respect to changes of the position of the focus lens, and a second graph in a bar shape is generated when the state is the second adjustment state, the second graph in which the evaluation value indicating the focus state changes according to changes of a position of the tracking lens.

7. The tracking adjustment method according to claim 6, wherein in the area setting step, the size of the detection area in the second adjustment state is set smaller than the size of the detection area in the first adjustment state.

8. The tracking adjustment method according to claim 6, wherein in the area setting step, an image of a specific still subject is extracted from the image signal, and the size of the detection area is switched according to a size of the extracted image.

9. The tracking adjustment method according to claim 7, wherein in the determining step, it is determined whether the state is the first adjustment state or the second adjustment state based on a zoom position signal indicating a position of the zoom lens outputted from one of the zoom instruction input device and the lens device.

10. The tracking adjustment method according to claim 7, wherein in the determining step, it is determined whether the state is the first adjustment state or the second adjustment state based on an input operation by a user.

11. A non-transitory computer-readable medium storing a program which causes a computer device to perform the tracking adjustment method according to claim 6.

* * * * *